US011802543B2

United States Patent
Merzhaeuser et al.

(10) Patent No.: US 11,802,543 B2
(45) Date of Patent: Oct. 31, 2023

(54) JOINTED ROTOR BLADE HAVING INTERNAL SUPPORT STRUCTURE WITH VARYING FIBER ORIENTATION FOR PIN REINFORCEMENT

(71) Applicant: General Electric Company, Schenectady, NY (US)

(72) Inventors: Thomas Merzhaeuser, Munich (DE); Andrew Mitchell Rodwell, Greenville, SC (US); Scott Jacob Huth, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/415,871

(22) PCT Filed: Dec. 19, 2018

(86) PCT No.: PCT/US2018/066374
§ 371 (c)(1),
(2) Date: Jun. 18, 2021

(87) PCT Pub. No.: WO2020/131043
PCT Pub. Date: Jun. 25, 2020

(65) Prior Publication Data
US 2022/0082078 A1    Mar. 17, 2022

(51) Int. Cl.
*F03D 1/06* (2006.01)
*B29D 99/00* (2010.01)

(52) U.S. Cl.
CPC ....... *F03D 1/0675* (2013.01); *B29D 99/0025* (2013.01); *F05B 2230/60* (2013.01); *F05B 2240/302* (2013.01); *F05B 2280/6013* (2013.01)

(58) Field of Classification Search
CPC ............... F03D 1/0675; B29D 99/0025; F05B 2230/60; F05B 2240/302; F05B 2280/6013
See application file for complete search history.

(56) References Cited

U.S. PATENT DOCUMENTS

| 851,196 A | 4/1907 | Bevans et al. |
| 4,474,536 A | 10/1984 | Gougeon et al. |
| (Continued) | | |

FOREIGN PATENT DOCUMENTS

| EP | 2186622 A1 | 5/2010 |
| EP | 3144526 A1 | 3/2017 |
| (Continued) | | |

OTHER PUBLICATIONS

Examiner Initials.

*Primary Examiner* — Courtney D Heinle
*Assistant Examiner* — Sang K Kim
(74) *Attorney, Agent, or Firm* — Dority & Manning, P.A.

(57) ABSTRACT

A rotor blade for a wind turbine includes a first blade segment and a second blade segment extending in opposite directions from a chord-wise joint. The blade segments each have at least one shell member defining an airfoil surface and an internal support structure. The internal support structure of the first blade segment includes a beam structure that structurally connects with the internal support structure of the second blade segment via a receiving section. The rotor blade further includes one or more pin joints positioned on at least one of internal support structures of the blade segments. Further, at least one of internal support structures is constructed, at least in part, of a resin material having a plurality of fibers cured therein. The fibers are arranged with varying fiber orientations along a span of the rotor blade at locations of the pin joint(s).

12 Claims, 6 Drawing Sheets

(56) References Cited

U.S. PATENT DOCUMENTS

| | | |
|---|---|---|
| 4,643,646 A | 2/1987 | Hahn et al. |
| 4,732,542 A | 3/1988 | Hahn et al. |
| 5,281,454 A | 1/1994 | Hanson |
| 6,843,953 B2 | 1/2005 | Filsinger et al. |
| 7,334,989 B2 | 2/2008 | Arelt |
| 7,344,360 B2 | 3/2008 | Wetzel |
| 7,901,188 B2 | 3/2011 | Llorente Gonzalez et al. |
| 7,922,454 B1 | 4/2011 | Riddell |
| 7,927,077 B2 | 4/2011 | Olson |
| 7,997,874 B2 | 8/2011 | van der Bos |
| 7,998,303 B2 | 8/2011 | Baehmann et al. |
| 8,123,488 B2 | 2/2012 | Finnigan et al. |
| 8,297,932 B2 | 10/2012 | Arocena De La Rua et al. |
| 8,348,622 B2 | 1/2013 | Bech |
| 8,356,982 B2 | 1/2013 | Petri Larrea et al. |
| 8,376,713 B2 | 2/2013 | Kawasetsu et al. |
| 8,388,316 B2 | 3/2013 | Arocena De La Rua et al. |
| 8,517,689 B2 | 8/2013 | Kyriakides et al. |
| 8,764,401 B2 * | 7/2014 | Hayden ............ F03D 1/0633 416/224 |
| 8,919,754 B2 | 12/2014 | Schibsbye |
| 9,669,589 B2 | 6/2017 | Zamora Rodriguez et al. |
| 9,964,096 B2 * | 5/2018 | Wetzel ............ F03D 1/0675 |
| 11,306,697 B2 * | 4/2022 | Girolamo ............ F03D 1/0675 |
| 2007/0018049 A1 | 1/2007 | Stuhr |
| 2007/0253824 A1 | 11/2007 | Eyb |
| 2009/0068017 A1 * | 3/2009 | Rudling ............ F03D 1/0675 29/889.71 |
| 2009/0116962 A1 | 5/2009 | Pedersen et al. |
| 2009/0155084 A1 | 6/2009 | Livingston et al. |
| 2009/0162208 A1 | 6/2009 | Zirin et al. |
| 2010/0132884 A1 | 6/2010 | Baehmann et al. |
| 2010/0215494 A1 | 8/2010 | Bech et al. |
| 2010/0304170 A1 | 12/2010 | Frederiksen |
| 2011/0052403 A1 | 3/2011 | Kawasetsu et al. |
| 2011/0081247 A1 | 4/2011 | Hibbard |
| 2011/0081248 A1 | 4/2011 | Hibbard |
| 2011/0091326 A1 | 4/2011 | Hancock |
| 2011/0135485 A1 | 6/2011 | Wang |
| 2011/0158788 A1 | 6/2011 | Bech et al. |
| 2011/0158806 A1 | 6/2011 | Arms et al. |
| 2011/0229336 A1 | 9/2011 | Richter et al. |
| 2012/0093627 A1 | 4/2012 | Christenson et al. |
| 2012/0196079 A1 | 8/2012 | Brauers et al. |
| 2012/0213642 A1 | 8/2012 | Wang et al. |
| 2012/0269643 A1 | 10/2012 | Hibbard et al. |
| 2012/0308396 A1 | 12/2012 | Hibbard |
| 2013/0040151 A1 | 2/2013 | Jeromerajan et al. |
| 2013/0064663 A1 | 3/2013 | Loth et al. |
| 2013/0129518 A1 | 5/2013 | Hayden et al. |
| 2013/0164133 A1 | 7/2013 | Grove-Nielsen |
| 2013/0177433 A1 | 7/2013 | Fritz et al. |
| 2013/0189112 A1 | 7/2013 | Hedges et al. |
| 2013/0189114 A1 | 7/2013 | Jenzewski et al. |
| 2013/0219718 A1 | 8/2013 | Busbey et al. |
| 2013/0224032 A1 | 8/2013 | Busbey et al. |
| 2013/0236307 A1 | 9/2013 | Stege |
| 2013/0236321 A1 | 9/2013 | Olthoff |
| 2013/0315747 A1 * | 11/2013 | Schibsbye ............ F03D 1/0675 416/230 |
| 2014/0286780 A1 | 9/2014 | Lemos et al. |
| 2015/0204200 A1 | 7/2015 | Eyb et al. |
| 2015/0369211 A1 | 12/2015 | Merzhaeuser |
| 2016/0195061 A1 | 7/2016 | Guenther |
| 2016/0288429 A1 * | 10/2016 | Bergstrom ............ B29B 11/16 |
| 2018/0274521 A1 | 9/2018 | Akhtar et al. |
| 2019/0353143 A1 * | 11/2019 | Girolamo ............ B29D 99/0025 |

FOREIGN PATENT DOCUMENTS

| | | |
|---|---|---|
| FR | 2710871 A1 | 4/1995 |
| GB | 2477847 A | 8/2011 |
| WO | WO2009/034291 A2 | 3/2009 |
| WO | WO2009/077192 A2 | 6/2009 |
| WO | WO2010/023299 A2 | 3/2010 |
| WO | WO2011/064553 A2 | 6/2011 |
| WO | WO2011/066279 A2 | 6/2011 |
| WO | WO2014/067527 A1 | 5/2014 |
| WO | WO2015/051803 A1 | 4/2015 |
| WO | WO2015/185066 A1 | 12/2015 |

* cited by examiner

JOINTED ROTOR BLADE HAVING INTERNAL SUPPORT STRUCTURE WITH VARYING FIBER ORIENTATION FOR PIN REINFORCEMENT

FIELD

The present disclosure relates generally to wind turbines, and more particularly to jointed rotor blades for wind turbines having one or more internal support structures, such as spar caps, with varying fiber orientation for pin reinforcement.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites.

In recent years, wind turbines for wind power generation have increased in size to achieve improvement in power generation efficiency and to increase the amount of power generation. Along with the increase in size of wind turbines for wind power generation, wind turbine rotor blades have also increased in size. As such, various difficulties, such as a difficulty in integral manufacture and transportation difficulties, may occur in wind turbine rotor blades.

One known strategy for reducing the complexity and costs associated with pre-forming, transporting, and erecting wind turbines having rotor blades of increasing sizes is to manufacture the rotor blades in blade segments. The blade segments may then be assembled to form the rotor blade after, for example, the individual blade segments are transported to the field. More specifically, some blade segments may be joined together via one or more pins. However, such joint designs for connecting the blade segments together are not without issue. For example, in certain pin-jointed rotor blades, the main fiber direction in a spar cap thereof is oriented in a span-wise direction so as to optimize for blade bending stiffness. Fiber orientations in the span-wise direction alone, however, do not account for the location introduction of shear loads by the pins.

Thus, the art is continuously seeking new and improved jointed rotor blades for wind turbines the addresses the aforementioned issues. Accordingly, the present disclosure is directed to a jointed rotor blade for a wind turbine having one or more internal support structures with varying fiber orientation for pin reinforcement.

BRIEF DESCRIPTION

Aspects and advantages of the invention will be set forth in part in the following description, or may be obvious from the description, or may be learned through practice of the invention.

In one aspect, the present disclosure is directed to a rotor blade for a wind turbine. The rotor blade includes a first blade segment and a second blade segment extending in opposite directions from a chord-wise joint. Each of the first and second blade segments has at least one shell member defining an airfoil surface and an internal support structure. The internal support structure of the first blade segment includes a beam structure extending lengthwise that structurally connects with the internal support structure of the second blade segment via a receiving section. The rotor blade further includes one or more pin joints positioned on at least one of internal support structures of the first blade segment or the second blade segment. Further, at least one of internal support structures of the first blade segment or the second blade segment is constructed, at least in part, of a resin material having a plurality of fibers cured therein. Moreover, the fibers are arranged with varying fiber orientations along a span of the rotor blade at locations of the pin joint(s).

In one embodiment, at least one of the internal support structures of the first and second blade segments may include a suction side spar cap and/or a pressure side spar cap.

In another embodiment, the varying fiber orientations may include, at least, a first fiber orientation in a span-wise direction of the rotor blade and a second fiber orientation in a non-span-wise direction. In such embodiments, the non-span-wise direction may range from about 45 degrees with respect to the span-wise direction to about a chord-wise direction. For example, in one embodiment, the non-span-wise direction may be equal to approximately the chord-wise direction. In addition, in certain embodiments, a majority of the plurality of fibers may be oriented in the first fiber orientation. In further embodiments, at least a portion of the plurality of fibers may have a quasi-isotropic fiber orientation at the locations of the bolts joint(s).

In additional embodiments, the resin material may include a thermoset resin or a thermoplastic resin. In several embodiments, the plurality of fibers may include, for example, glass fibers, carbon fibers, polymer fibers, wood fibers, bamboo fibers, ceramic fibers, nanofibers, metal fibers, or combinations thereof.

In yet another embodiment, the pin joint(s) may include, at least, one or more first pin joints located at a first end of the beam structure for connecting with a receiving end of the receiving section of the second blade segment and/or at least one chord-wise extending pin joint located on the beam structure proximate to the chord-wise joint.

In another aspect, the present disclosure is directed to a method of assembling a rotor blade of a wind turbine. The method includes arranging a first blade segment and a second blade segment in opposite directions from a chord-wise joint. Each of the first and second blade segments have a shell member defining an airfoil surface and an internal support structure. Further, at least one of the internal support structures of the blade segments includes at least one spar cap. The method also includes inserting the beam structure extending lengthwise from the first blade segment into a receiving section of the second blade segment. Further, the method includes attaching a free end of the beam structure with a receiving end of the receiving section of the second blade segment using one or more first pin joints. Moreover, the method includes connecting the first and second blade segments using one or more second pin joints located at the chord-wise joint. As such, at least one of internal support structures of the first blade segment or the second blade segment is constructed, at least in part, of a resin material comprising a plurality of fibers cured therein. In addition, the fibers are arranged with varying fiber orientations along a span of the rotor blade at locations of the first and/or second pin joint(s). It should be further understood that the method may further include any of the additional steps and/or features as described herein.

In yet another aspect, the present disclosure is directed to a rotor blade for a wind turbine. The rotor blade includes at least one shell member defining an airfoil surface and an internal support structure. The internal support structure includes a beam structure extending lengthwise and having a suction side spar cap and a pressure side spar cap. Further, the internal support structure is constructed, at least in part, of a resin material comprising a plurality of fibers cured therein. Moreover, the fibers are arranged with varying fiber orientations along a span of the rotor blade. It should be further understood that the rotor blade may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
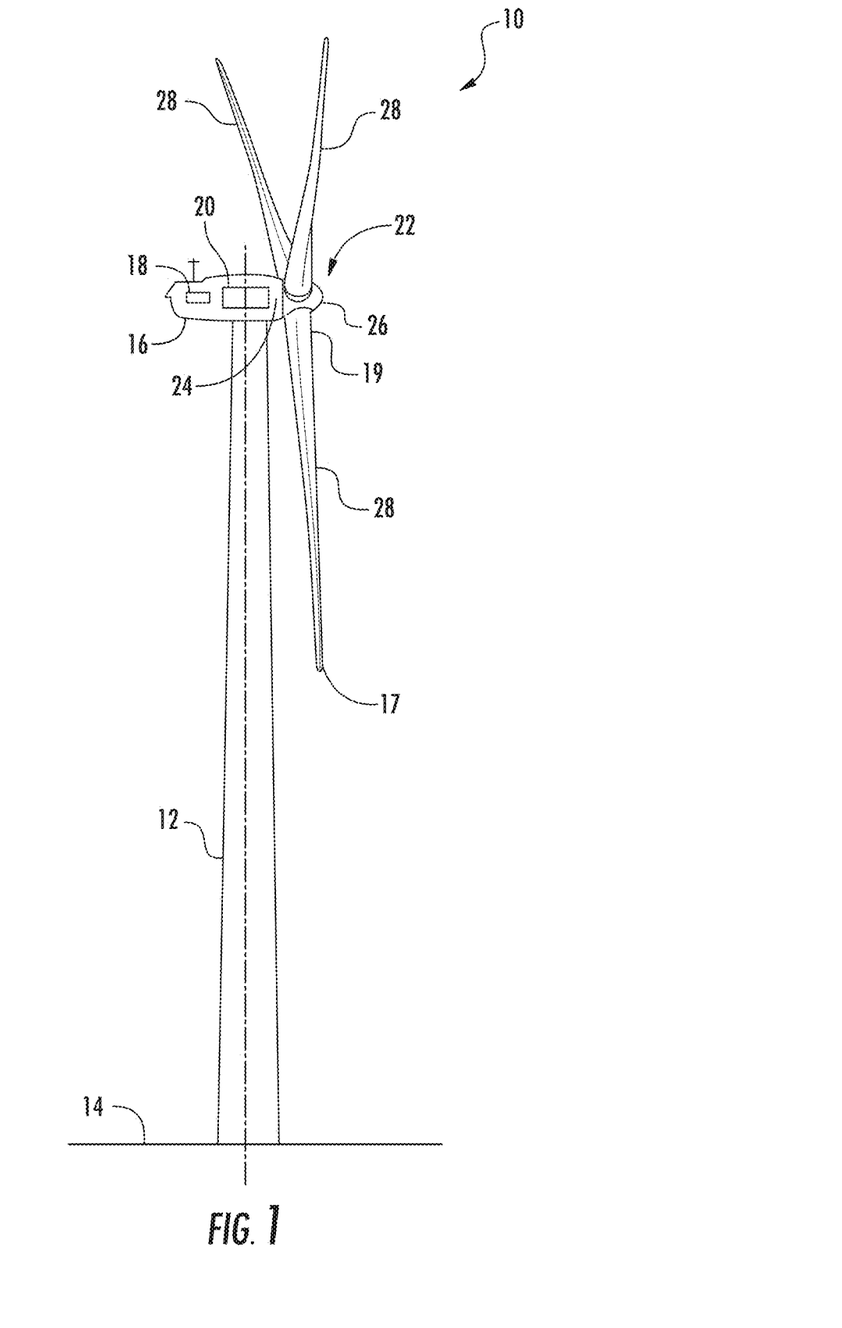
FIG. 1 illustrates a perspective view of one embodiment of a wind turbine according to the present disclosure.

Referring now to the drawings, FIG. 1 illustrates a perspective view of one embodiment of a wind turbine 10 according to the present invention. In the illustrated embodiment, the wind turbine 10 is a horizontal-axis wind turbine. Alternatively, the wind turbine 10 may be a vertical-axis wind turbine. In addition, as shown, the wind turbine 10 may include a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. Further, as shown, the rotor 22 includes a rotatable hub 26 and at least one rotor blade 28 coupled to and extending outward from the rotatable hub 26. As shown, the rotor blade 28 includes a blade tip 17 and a blade root 19.

Figure 2:
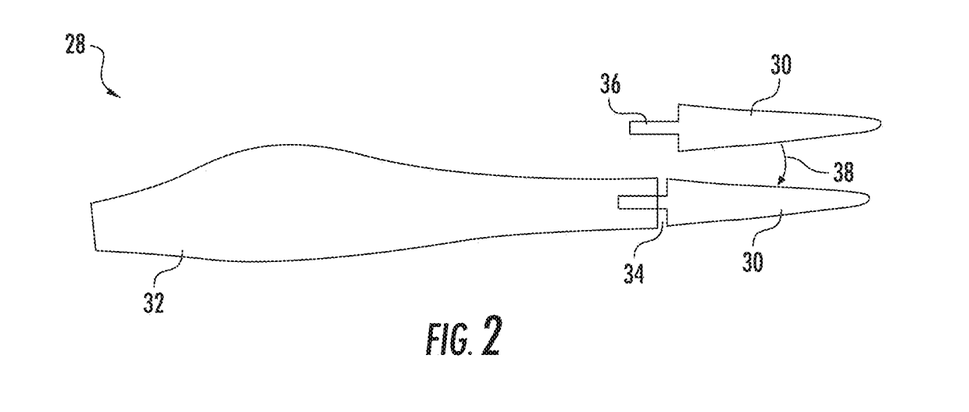
FIG. 2 illustrates a plan view of one embodiment of a rotor blade having a first blade segment and a second blade segment according to the present disclosure.

Referring now to FIG. 2, a plan view of one of the rotor blades 28 of FIG. 1 is illustrated. As shown, the rotor blade 28 may include a first blade segment 30 and a second blade segment 32. Further, as shown, the first blade segment 30 and the second blade segment 32 may each extend in opposite directions from a chord-wise joint 34. In addition, as shown, each of the blade segments 30, 32 may include at least one shell member defining an airfoil surface. The first blade segment 30 and the second blade segment 32 are connected by at least an internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32.

Figure 3:
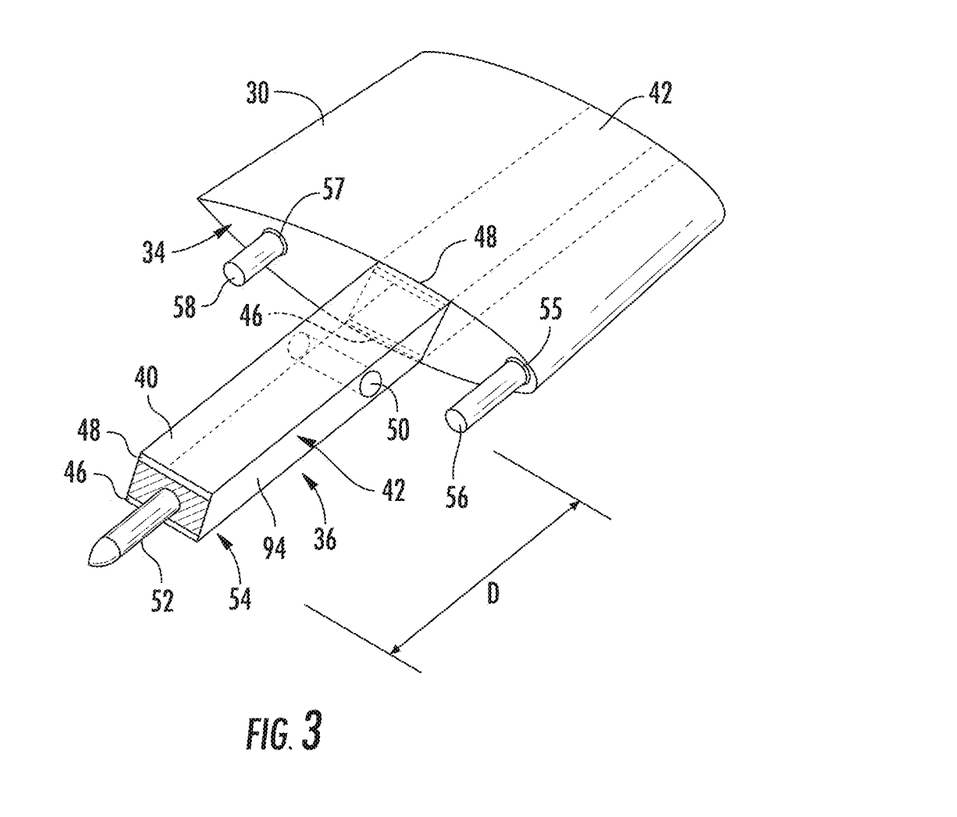
FIG. 3 illustrates a perspective view of a section of one embodiment of the first blade segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthwise for structurally connecting with the second blade segment 32. Further, as shown, the beam structure 40 forms a part of the first blade segment 30 having an extension protruding from a spar section 42, thereby forming an extending spar section. The beam structure 40 may include a shear web 44 connected with a suction side spar cap 46 and a pressure side spar cap 48.

Moreover, as shown, the first blade segment 30 may include one or more first pin joints towards a first end 54 of the beam structure 40. In one embodiment, the pin joint may include a pin that is in a tight interference fit with a bushing. More specifically, as shown, the pin joint(s) may include one pin tube 52 located on the beam structure 40. Thus, as shown, the pin tube 52 may be oriented in a span-wise direction. Further, the first blade segment 30 may also include a pin joint slot 50 located on the beam structure 40 proximate to the chord-wise joint 34. Moreover, as shown, the pin joint slot 50 may be oriented in a chord-wise direction. In one example, there may be a bushing within the pin joint slot 50 arranged in a tight interference fit with a pin tube or pin (shown as pin 53 in FIG. 6). Further, the first blade segment 30 may include multiple second pin joint tubes 56, 58 located at the chord-wise joint 34. Thus, as shown, the second pin joint tubes 56, 58 may include a leading edge pin joint tube 56 and a trailing edge pin joint tube 58. Further, each of the second pin joint tubes 56, 58 may be oriented in a span-wise direction. In addition, as shown, each of the second pin joint tubes 56, 58 may include multiple flanges 55, 57, respectively, that are configured to distribute compression loads at the chord-wise joint 34.

It is to be noted that the pin tube 52 located at the first end of the beam structure 40 may be separated span-wise with the multiple second pin joint tubes 56, 58 located at the chord-wise joint 34 by an optimal distance D. This optimal distance D may be such that the chord-wise joint 34 is able to withstand substantial bending moments caused due to shear loads acting on the chord-wise joint 34. In another embodiment, each of the pin joints connecting the first and second blade segments 30, 32 may include an interference-fit steel bushed joint.

Figure 4:
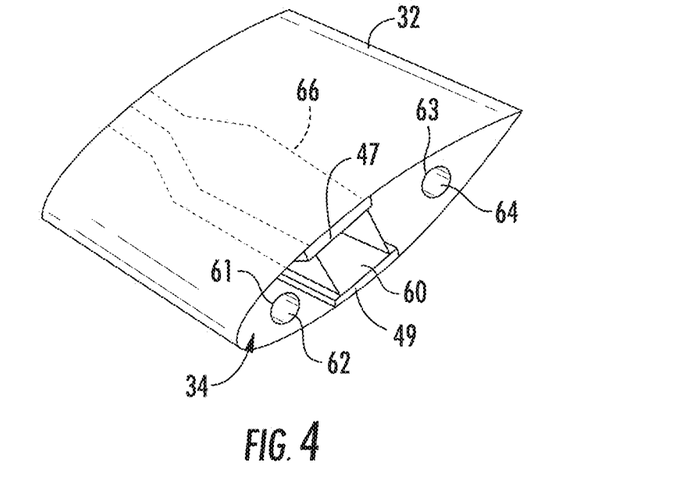
FIG. 4 illustrates a perspective view of one embodiment of a section of the second blade segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 includes a receiving section 60 extending lengthwise within the second blade segment 32 for receiving the beam structure 40 of the first blade segment 30. Further, as shown, the receiving section 60 includes multiple web structures 66 that extend lengthwise for connecting with the beam structure 40 of the first blade segment 30. In addition, as shown, the receiving section 60 may include a suction side spar cap 47 and a pressure side spar cap 49 on an inner surface of the second blade segment 32. The second blade segment 32 may further include pin joint slots 62, 64 for receiving pin tubes 56, 58 (shown in FIG. 3) of the first blade segment 30 and forming tight interference fittings. In one example, each of the multiple pin joint slots 62, 64 may include multiple flanges 61, 63, respectively, that are configured to distribute compression loads at the chord-wise joint 34.

Figure 5:
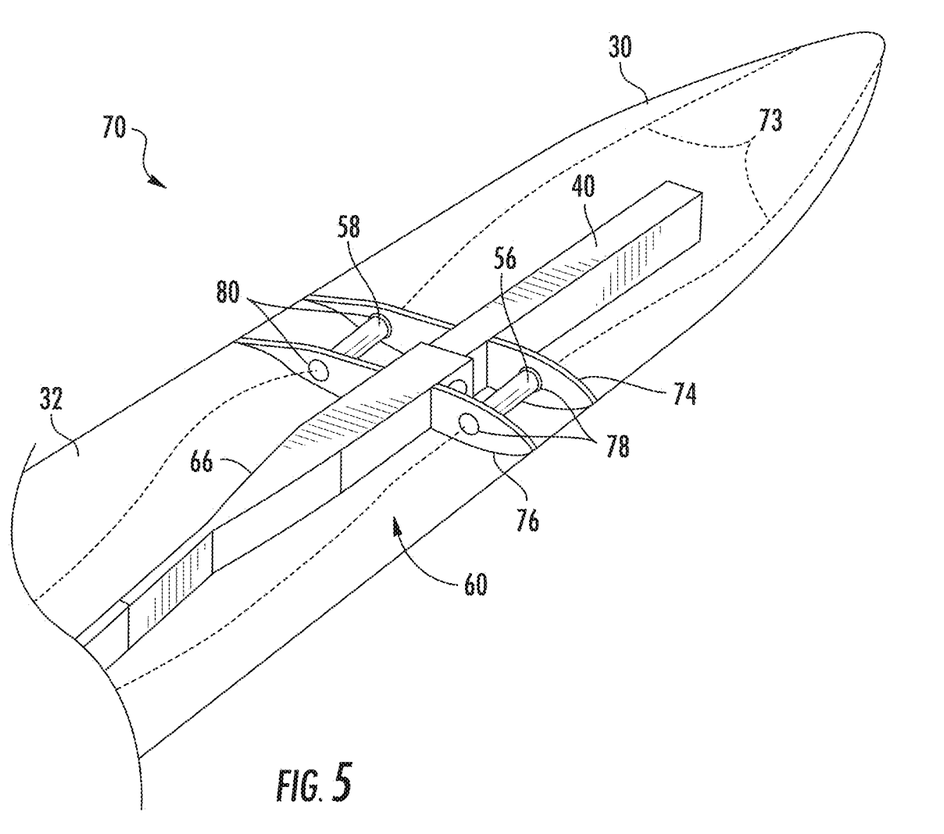
FIG. 5 illustrates an assembly of one embodiment of the rotor blade of the wind turbine having the first blade segment joined with the second blade segment according to the present disclosure.

Referring now to FIG. 5, an assembly 70 of the rotor blade 28 having the first blade segment 30 joined with the second blade segment 32 according to the present disclosure is illustrated. As shown, the assembly 70 illustrates multiple supporting structures beneath outer shell members of the rotor blade 28 having the first blade segment 30 joined with the second blade segment 32. Further, as shown, the receiving section 60 includes the multiple web structures 66 extending lengthwise and supports the beam structure 40. The receiving section 60 also includes a rectangular fastening element 72 that connects with the pin tube 52 of the beam structure 40 in the span-wise direction. Further, the first and the second blade segments 30, 32 may also include chord-wise members 74, 76 respectively at the chord-wise joint 34. Further, as shown, the chord-wise members 74, 76 may include leading edge pin openings 78 and trailing edge pin openings 80 that allows pin joint connections between the first and second blade segments 30, 32. For example, as shown, the chord-wise members 74, 76 are connected by pin tubes 56 and 58 that are in tight interference fit with bushings located in the leading edge pin openings 78 and the trailing edge pin openings 80. In another embodiment, each of the web structures 66, the rectangular fastening element 72, and the chord-wise members 74, 76 may be constructed of glass reinforced fibers. In this example, the assembly 70 may also include multiple lightening receptor cables 73 that are embedded between the multiple pin tubes or pins 56, 58 and the bushing connections attached to the chord-wise members 74, 76.

Figure 6:
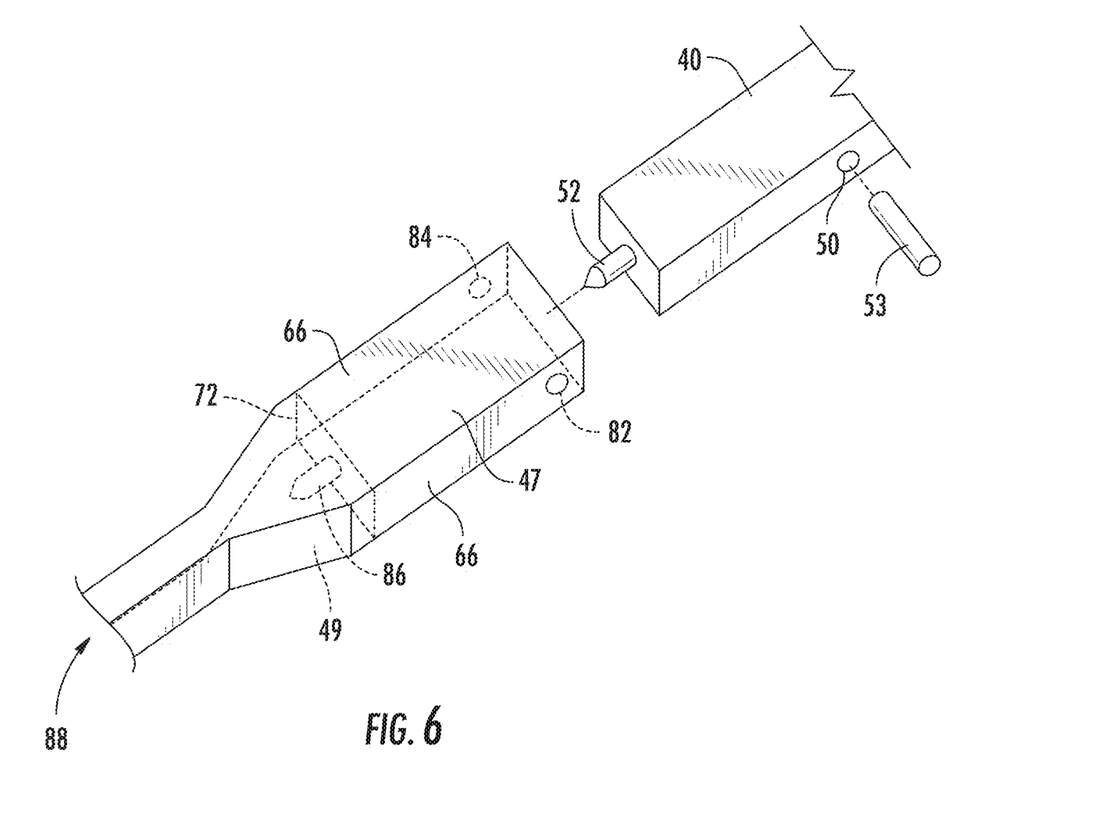
FIG. 6 illustrates an exploded perspective view of one embodiment of the multiple supporting structures of the assembly of the rotor blade of the wind turbine according to the present disclosure.

Referring now to FIG. 6, an exploded perspective view of the multiple supporting structures of the assembly 70 towards the receiving section 60 of the rotor blade 28 is illustrated. As shown, the receiving section 60 includes web structures 66 and one or more optional spar caps 47, 49 that are configured to receive the beam structure 40 therein. In addition, as shown, the receiving section 60 includes pin joint slots 82, 84 that are aligned with the pin joint slot 50 of the beam structure 40 through which a pin tube or pin 53 may be inserted. Further, in one embodiment, the pin 53 is configured to remain in a tight interference fit within the aligned pin joint slots 82, 50, 84 such that the receiving section 60 and the beam structure 40 are joined together by during assembling. Further, the receiving section 60 may also include a chord-wise member 72 that includes a pin joint slot 86 configured for receiving the pin tube 52 of the beam structure 40. In such embodiments, the pin tube 52 is configured to form a tight interference fit bolted joint. Further, as shown, the web structures 66 may converge together at one end 88 so as to form a shear web-type structure that extends lengthwise within the second blade segment 32.

Figure 7:
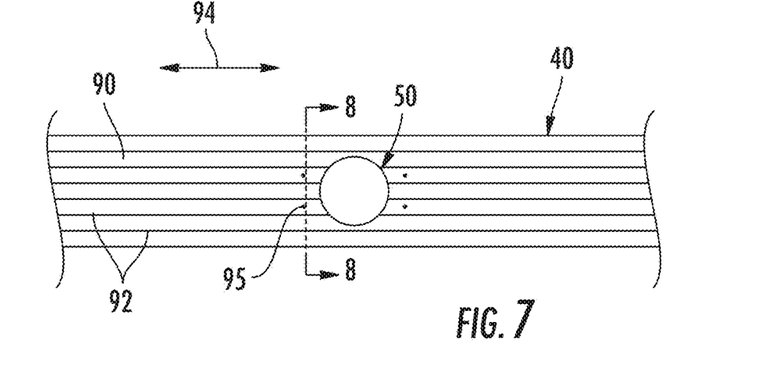
FIG. 7 illustrates a span-wise view of one embodiment of a beam structure of a blade segment of a rotor blade according to the present disclosure, particularly illustrating varying fiber orientations within the beam structure.
Figure 8:
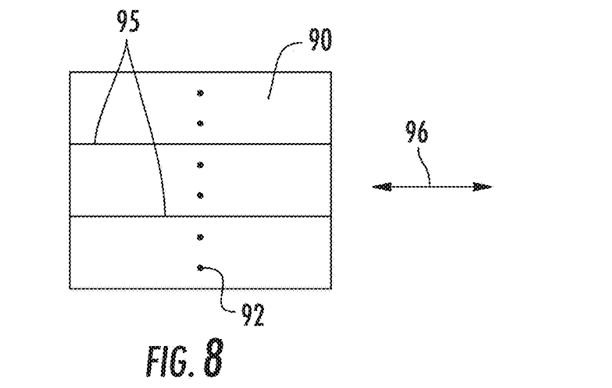
FIG. 8 illustrates a chord-wise view of the beam structure of FIG. 7 along section line 8-8.

Referring now to FIGS. 7, 8, 9A, 9B, and 9C, various views of portions of one embodiment of the beam structure 40 of the rotor blade 28 described herein that include varying fiber orientations along a span of the rotor blade 28 are illustrated. For example, in one embodiment, the various pin joint locations described herein may include varying fiber orientations. As such, the varying fiber orientations may be chosen to have improved shear loading to allow for higher concentration of loads at the pin joints. Therefore, the better the properties, the smaller the pins and/or the thinner the spar caps 46, 47, 48, 49 can be. More specifically, FIGS. 7 and 8 illustrate a span-wise view (FIG. 7) and a chord-wise view (FIG. 8) of the beam structure 40. As shown in the illustrated embodiment, the beam structure 40 may be constructed, at least in part, of a resin material 90 having a plurality of fibers 92, 95 cured therein. Moreover, as shown, the fibers 92, 95 are arranged with varying fiber orientations along the span of the rotor blade 28, at least, at locations of the pin joint slot(s) 50.

Figure 9A:
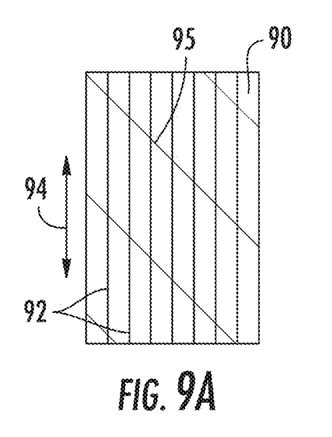
FIG. 9A illustrates a top view of a portion of one embodiment of an internal support structure of a blade segment of a rotor blade according to the present disclosure, particularly illustrating varying fiber orientations within the internal support structure.
Figure 9B:
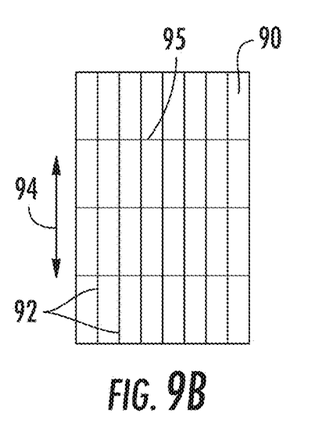
FIG. 9B illustrates a top view of a portion of another embodiment of an internal support structure of a blade segment of a rotor blade according to the present disclosure, particularly illustrating varying fiber orientations within the internal support structure.
Figure 9C:
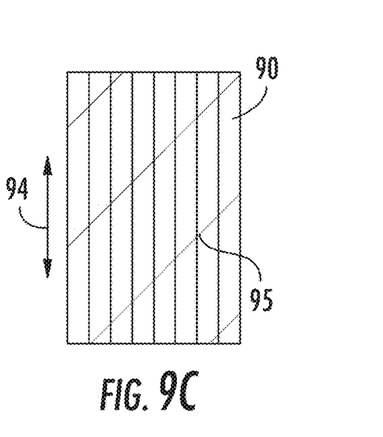
FIG. 9C illustrates a top view of a portion of still another embodiment of an internal support structure of a blade segment of a rotor blade according to the present disclosure, particularly illustrating varying fiber orientations within the internal support structure.

More specifically, as shown generally in FIGS. 7, 8, 9A, 9B, and 9C, the fibers 92, 95 may be arranged in multiple varying fiber orientations including but not limited to, at least, fibers having a first fiber orientation 92 which corresponds to a span-wise direction 94 of the rotor blade 28 and a second fiber orientation 95 which corresponds to a non-span-wise direction. In such embodiments, the non-span-wise direction may range from about 45 degrees with respect to the span-wise direction 94 to about a chord-wise direction. For example, as shown particularly in FIGS. 9A and 9B, the non-span-wise direction may be equal to about 45 degrees with respect to the span-wise direction 94. Alternatively, as shown in FIG. 9B, the non-span-wise direction may be approximately equal to the chord-wise direction 96 of the rotor blade 28.

In addition, as shown generally in FIGS. 7, 8, 9A, 9B, and 9C, a majority of the fibers 92, 95 may be oriented in the first fiber orientation 92 with the remaining fibers 95 oriented in another direction. For example, in one embodiment, only local fibers 95 near the pin joints may be oriented in the non-span-wise direction. In further embodiments, at least a portion of the plurality of fibers 92, 95 may have a quasi-isotropic fiber orientation at the locations of the bolts joint(s).

The resin material 90 described herein may include, for example, a thermoset resin or a thermoplastic resin. The thermoplastic materials as described herein may generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, the thermoset materials as described herein may generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

The fibers 92, 95 described herein may include, for example, glass fibers, carbon fibers, polymer fibers, wood fibers, bamboo fibers, ceramic fibers, nanofibers, metal fibers, or combinations thereof. Further, the fiber content may vary depending on the thickness or stiffness required for transferring the load at a particular location in the structure.

Figure 10:
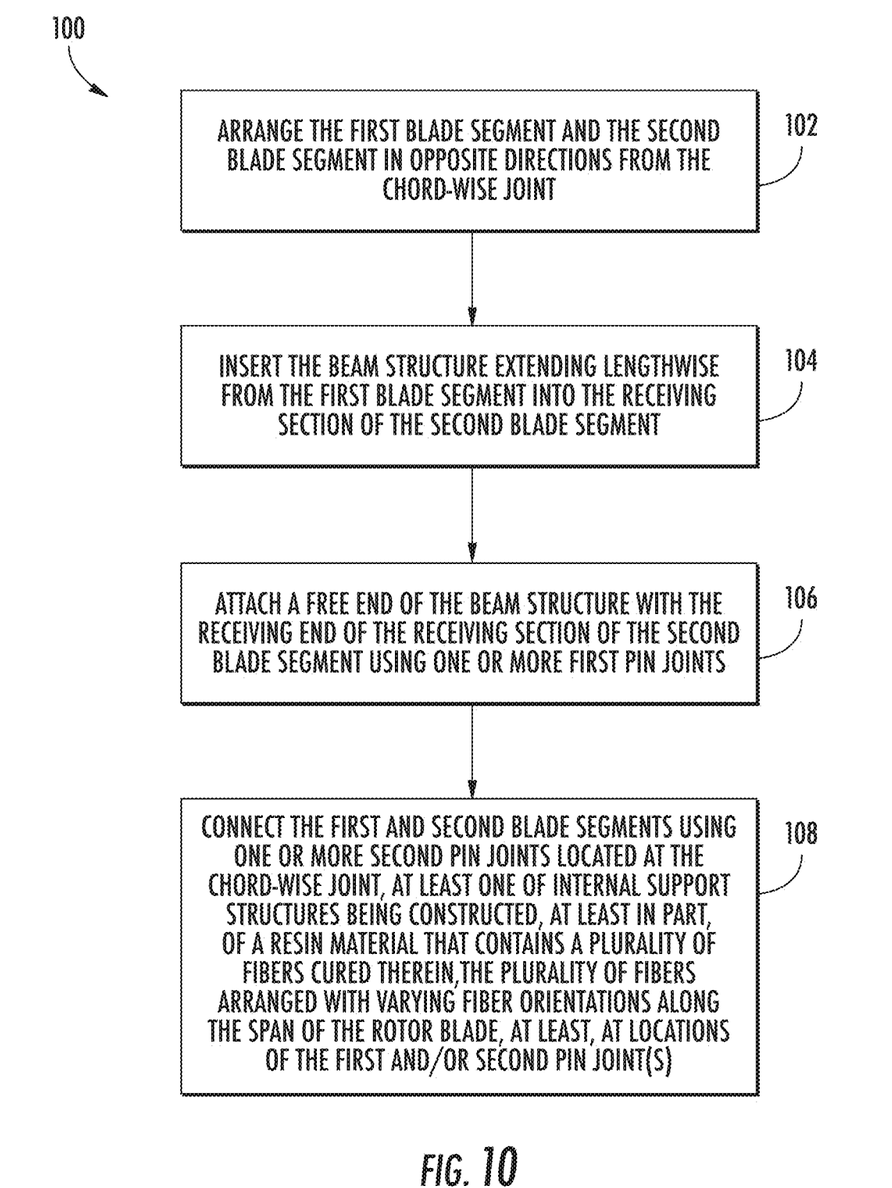
FIG. 10 illustrates a flow chart of one embodiment of a method of assembling a rotor blade of a wind turbine according to the present disclosure.

Referring now to FIG. 10, a flow chart 100 of a method of assembling a rotor blade of a wind turbine according to the present disclosure is illustrated. In general, the method 100 will be described herein with reference to the wind turbine 10 and the rotor blade 28 shown in FIGS. 1-9C. However, it should be appreciated that the disclosed method 100 may be implemented with rotor blades having any other suitable configurations. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 may include arranging the first blade segment 30 and the second blade segment 32 in opposite directions from the chord-wise joint 34. As shown at (104), the method 100 may include inserting the beam structure 40 extending lengthwise from the first blade segment 30 into the receiving section 60 of the second blade segment 32. As shown at (106), the method 100 may include attaching a free end of the beam structure 40 with the receiving end 54 of the receiving section 60 of the second blade segment 32 using one or more first pin joints 52. As shown at (108), the method 100 may include connecting the first and second blade segments 30, 32 using one or more second pin joints 53, 56, 58 located at the chord-wise joint 34. As such, at least one of internal support structures of the first blade segment 30 or the second blade segment 32 is constructed, at least in part, of a resin material 60 that contains a plurality of fibers 92, 95 cured therein. In addition, as mentioned, the fibers 92, 95 are arranged with varying fiber orientations along the span of the rotor blade 28, at least, at locations of the first and/or second pin joint(s).

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
a first blade segment and a second blade segment extending in opposite directions from a chord-wise joint, each of the first and second blade segments comprising at least one shell member defining an airfoil surface and an internal support structure, the internal support structure of the first blade segment comprising a beam structure extending lengthwise that structurally connects with the internal support structure of the second blade segment via a receiving section; and,
one or more pin joints positioned on at least one of internal support structures of the first blade segment or the second blade segment,
wherein at least one of internal support structures of the first blade segment or the second blade segment is constructed, at least in part, of a resin material and a plurality of fibers embedded therein, the plurality of fibers having varying fiber orientations along a span of the rotor blade, at least, at locations of the one or more pin joints, wherein the varying fiber orientations comprise, at least, a first fiber orientation extending in a direction parallel to a span-wise direction of the rotor blade and a second fiber orientation extending in a direction parallel to a chord-wise direction, wherein the one or more pin joints comprise local fibers being the only of the plurality of fibers being oriented in the second fiber orientation.

2. The rotor blade of claim 1, wherein at least one of the internal support structures of the first and second blade segments comprise at least one of a suction side spar cap or a pressure side spar cap.

3. The rotor blade of claim 1, wherein a majority of the plurality of fibers are oriented in the first fiber orientation.

4. The rotor blade of claim 1, wherein at least a portion of the plurality of fibers comprise a quasi-isotropic fiber orientation at the locations of the one or more bolts joints.

5. The rotor blade of claim 1, wherein the resin material comprises at least one of a thermoset resin or a thermoplastic resin, and wherein the plurality of fibers comprise at least one of glass fibers, carbon fibers, polymer fibers, wood fibers, bamboo fibers, ceramic fibers, nanofibers, metal fibers, or combinations thereof.

6. The rotor blade of claim 1, wherein the one or more pin joints comprises, at least, one or more first pin joints located at a first end of the beam structure for connecting with a receiving end of the receiving section of the second blade segment and at least one chord-wise extending pin joint located on the beam structure proximate to the chord-wise joint.

7. A method of assembling a rotor blade of a wind turbine, the method comprising:
arranging a first blade segment and a second blade segment in opposite directions from a chord-wise joint, each of the first and second blade segments having a shell member defining an airfoil surface and an internal support structure, at least one of the internal support structures of the blade segments comprising at least one spar cap;
inserting a beam structure extending lengthwise from the first blade segment into a receiving section of the second blade segment;
attaching a free end of the beam structure with a receiving end of the receiving section of the second blade segment using one or more first pin joints; and,
connecting the first and second blade segments using one or more second pin joints located at the chord-wise joint, wherein at least one of internal support structures of the first blade segment or the second blade segment is constructed, at least in part, of a resin material and plurality of fibers embedded therein, the plurality of fibers having varying fiber orientations along a span of the rotor blade that align with locations of at least one of the one or more first pin joints or the one or more second pin joints, wherein the varying fiber orientations comprise, at least, a first fiber orientation extending in a direction parallel to a span-wise direction of the rotor blade and a second fiber orientation extending in a direction parallel to a chord-wise direction, wherein only local fibers along the one or more pin joints are oriented in the second fiber orientation.

8. The method of claim 7, wherein a majority of the plurality of fibers are oriented in the first fiber orientation.

9. A rotor blade for a wind turbine, comprising:
at least one shell member defining an airfoil surface and an internal support structure, the internal support structure comprising a beam structure extending lengthwise and having a suction side spar cap and a pressure side spar cap; and
one or more pin joints positioned on the internal support structure of the at least one shell member,
wherein the internal support structure is constructed, at least in part, of a resin material and a plurality of fibers embedded therein, the plurality of fibers having varying fiber orientations along a span of the rotor blade, wherein the varying fiber orientations comprise, at least, a first fiber orientation extending in a direction parallel to a span-wise direction of the rotor blade and a second fiber orientation extending in a direction parallel to a chord-wise direction,
wherein the one or more pin joints comprise local fibers being the only of the plurality of fibers being oriented in the second fiber orientation.

10. The rotor blade of claim 9, wherein a majority of the plurality of fibers are oriented in the first fiber orientation.

11. The rotor blade of claim 9, wherein at least a portion of the plurality of fibers comprise a quasi-isotropic fiber orientation.

12. The rotor blade of claim 9, wherein the resin material comprises at least one of a thermoset resin or a thermoplastic resin, the plurality of fibers comprising at least one of glass fibers, carbon fibers, polymer fibers, wood fibers, bamboo fibers, ceramic fibers, nanofibers, metal fibers, or combinations thereof.

* * * * *